United States Patent
Hildenbrand et al.

(10) Patent No.: US 10,747,450 B2
(45) Date of Patent: Aug. 18, 2020

(54) DYNAMIC VIRTUAL MACHINE MEMORY ALLOCATION

(71) Applicant: Red Hat, Inc., Raleigh, NC (US)

(72) Inventors: David Hildenbrand, Grasbrunn (DE); Luiz Capitulino, Gaineau (CA)

(73) Assignee: Red Hat, Inc., Raleigh, NC (US)

( * ) Notice: Subject to any disclaimer, the term of this patent is extended or adjusted under 35 U.S.C. 154(b) by 7 days.

(21) Appl. No.: 16/046,580

(22) Filed: Jul. 26, 2018

(65) Prior Publication Data
US 2020/0034056 A1 Jan. 30, 2020

(51) Int. Cl.
G06F 3/06 (2006.01)
(52) U.S. Cl.
CPC .......... G06F 3/0631 (2013.01); G06F 3/0608 (2013.01); G06F 3/0653 (2013.01); G06F 3/0664 (2013.01); G06F 3/0673 (2013.01)
(58) Field of Classification Search
CPC .... G06F 3/0631; G06F 3/0653; G06F 3/0673; G06F 3/0608; G06F 3/0664
See application file for complete search history.

(56) References Cited

U.S. PATENT DOCUMENTS

| | | | |
|---|---|---|---|
| 7,979,857 B2 | 7/2011 | Esfahany et al. | |
| 9,176,780 B2 | 11/2015 | Tuch et al. | |
| 9,459,900 B2 | 10/2016 | Tsirkin | |
| 9,697,048 B2 | 7/2017 | Wagle et al. | |
| 9,886,313 B2 | 2/2018 | Wagle et al. | |
| 2002/0077155 A1* | 6/2002 | Chung | H04M 1/2745 455/564 |
| 2010/0017557 A1* | 1/2010 | Nakanishi | G06F 12/0246 711/103 |
| 2013/0117519 A1* | 5/2013 | Schreter | G06F 12/0284 711/165 |

(Continued)

FOREIGN PATENT DOCUMENTS

CN 105094980 A 11/2015

OTHER PUBLICATIONS

Zhang, et al., Automatic Memory Control of Multiple Virtual Machines on a Consolidated Server https://ieeexplore.ieee.orgistampistamp.jsp?tp=&arnumber=7012089; Department of Computer Science and Information Engineering, Chung Hua University, Hsinchu, Taiwan.; School of Computer Science and Technology, Harbin Institute of Technology, Harbin, China; Jan.-Mar. 2017; retrieved on Jun. 4, 2018; (13 Pages).

(Continued)

*Primary Examiner* — Hiep T Nguyen
(74) *Attorney, Agent, or Firm* — K&L Gates LLP

(57) ABSTRACT

A system includes at least one memory device, at least one processor in communication with the at least one memory device, a guest operating system (OS) associated with a device driver, and an out-of-memory (OOM) handler executing on the at least one processor. The OOM handler is configured to locate a memory device of the at least one memory device, send an out-of-memory request to the device driver that is associated with the memory device, and receive a response from the memory device. The device driver is configured to query an amount of unusable device memory, request to plug the unusable device memory, and report the previously unusable device memory as now usable memory.

20 Claims, 6 Drawing Sheets

(56) References Cited

U.S. PATENT DOCUMENTS

2014/0143516 A1* 5/2014 Dawson .............. G06F 12/0253
711/171
2018/0018113 A1* 1/2018 Koseki .................. G06F 3/0689
2019/0056883 A1* 2/2019 Kim ...................... G06F 12/126

OTHER PUBLICATIONS

Stolts; "Virtual Memory Management: Dynamic Memory-Much Different Than Memory Over Commit—Become a Virtualization Expert (Part 3 of 20)" Microsoft; https://blogs.technet.microsoft.com/danstolts/2013103/virtual-memory-management-dynamic-memory-much-different-than-memory-over-commit-become-a-virtualization-expert-part-3-of-20/; published Mar. 6, 2013; retrieved on Jun. 4, 2018; (11 Pages).

* cited by examiner

DYNAMIC VIRTUAL MACHINE MEMORY ALLOCATION

BACKGROUND

The present disclosure relates generally to memory management of virtual machines. Virtualization may be used to provide some physical components as logical objects in order to allow running various software modules, for example, multiple operating systems, concurrently and in isolation from other software modules, on one or more interconnected physical computer systems. Virtualization may be achieved by running a software layer, often referred to as a hypervisor, above the hardware and below the virtual machines.

Computer systems may run virtual machines with memory allocated by a hypervisor. With memory overcommit, virtual machines and their associated guest operating systems may "think" that they have access to more memory than is actually assigned by the hypervisor. When a guest operating system (OS) needs additional memory, the guest OS may use various techniques to free up additional memory.

SUMMARY

The present disclosure provides new and innovative systems and methods for dynamic virtual machine memory allocation. In an example, a system includes at least one memory device, at least one processor in communication with the at least one memory device, a guest operating system (OS) associated with a device driver, and an out-of-memory (OOM) handler executing on the at least one processor. The OOM handler is configured to locate a memory device of the at least one memory device, send an out-of-memory request to the device driver that is associated with the memory device, and receive a response from the memory device. The device driver is configured to query an amount of unusable device memory, request to plug the unusable device memory, and report the previously unusable device memory as now usable memory.

In an example, a method includes locating, by an out-of-memory (OOM) handler, a memory device. Additionally, the OOM handler sends an out-of-memory request to a device driver that is associated with the memory device and receives a response to the out-of-memory request from the memory device. The device driver queries an amount of unusable device memory, requests to plug the unusable device memory, and reports the previously unusable device memory as now usable memory.

In an example, a non-transitory machine readable medium stores code, which when executed by a processor, is configured to locate a memory device, send an out-of-memory request to a device driver that is associated with the memory device, receive a response to the out-of-memory request from the memory device, query an amount of unusable device memory, request to plug the unusable device memory, and report the previously unusable device memory as now usable memory.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF EXAMPLE EMBODIMENTS

Figure 1:
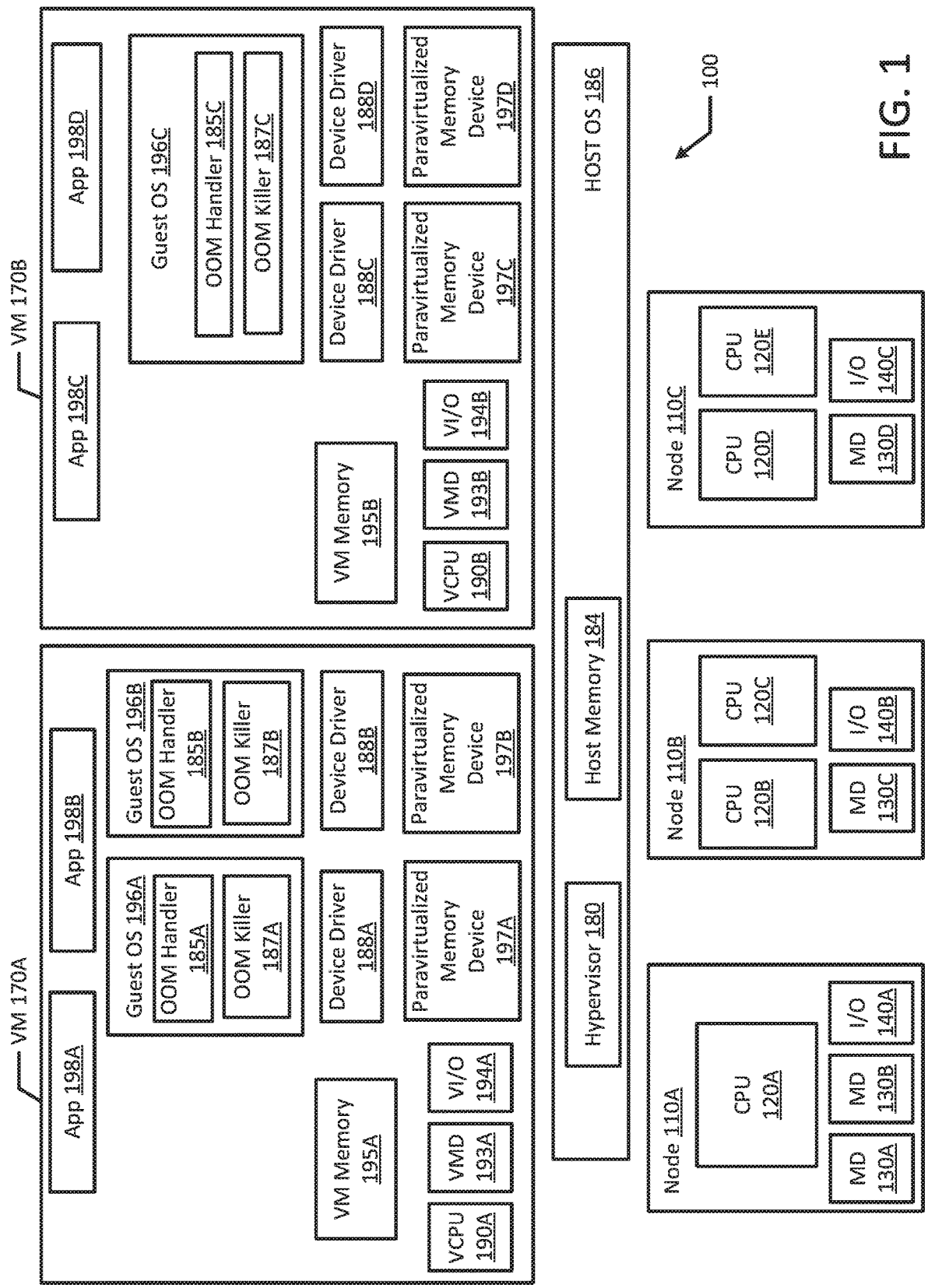
FIG. 1 illustrates a block diagram of an example computing system according to an example embodiment of the present disclosure.

Techniques are disclosed for dynamically increasing virtual machine memory allocation when the virtual machine reports that it is out of memory. Often times, when a guest operating system ("OS") handles a request to allocate memory, but is unable to find unused physical memory, the guest OS may typically try to free up physical memory using various memory freeing techniques such as flushing caches and swapping memory. With cache flushing, unwritten data in cache may periodically be written to a drive to free up cache space. For example, memory pages used as cache may be written to a disk when the page is dirty. For pages that are not dirty, flushing cache causes the non-dirty pages to be evicted from cache, which may result in performance degradation. Additionally, memory swapping is a memory reclamation method where memory contents not currently in use are swapped to a disk to make the memory available for other applications or processes. Both cache flushing and memory swapping are computationally expensive processes in regard to overall impact on system performance since moving data to and from the disk has considerable computational overhead.

Flushing caches and swapping memory is typically handled by an out-of-memory handler ("OOM handler"). If more memory is needed by a virtual machine, then the guest OS may activate an out-of-memory killer ("OOM killer"), which selects one or more processes to kill in order to free a greater amount of memory. However, using the OOM killer is problematic since the OOM killer may choose any process to kill, which may result in data loss for guest applications or even cause the system to become unstable or even crash.

In virtual environments, monitoring techniques may detect such out of memory scenarios. For example, the hypervisor can detect that the guest OS has little free physical memory and add more memory to the virtual machine. However, the memory freeing techniques and the monitoring techniques are typically not synchronous. Specifically, if the hypervisor is not able to react fast enough, the OOM killer may already be active and start killing processes before the hypervisor has time to add more memory to the virtual machine.

A potential solution of the above problem is to use balloon devices and balloon drivers operated by the guest OS to avoid the scenario where the hypervisor fails to add memory in time since the guest OS performs balloon operations via the balloon drivers. A balloon driver may be used to inflate balloon devices, which then may be deflated to provide additional memory to the guest OS when needed. However, the balloon device and driver solution is dependent on prior guest operation (e.g., a prior inflate operation) to make more memory available to the guest OS. With an ordinary balloon driver, the driver will typically inflate the balloon after the guest OS starts up, so that the balloon may be deflated in case of out-of-memory situations. However, the balloon device and balloon driver implementation has the disadvantage that a virtual machine typically has to be started with more memory than initially intended (e.g., unused memory sits in a balloon device until it is needed). Additionally, if the balloon driver does not start up in the guest OS to inflate the balloon initially, the guest OS might consume more memory than is requested. Furthermore, it is often times difficult to determine what size to inflate the balloon to initially. If the balloon is inflated too much, then valuable memory sits unused in the balloon device. If the balloon is inflated too little, then the balloon is unable to satisfy future out-of-memory requests.

As described in the various example embodiments disclosed herein, to prevent the OOM killer from prematurely killing processes, adding more memory to a virtual machine is performed synchronously from the OOM handler, before the OOM killer is activated by the guest OS. For example, the OOM handler may be activated to ask paravirtualized memory devices for more memory. Once activated, the OOM handler looks for candidate paravirtualized memory devices that may be asked to satisfy an out-of-memory request. In an example, out-of-memory requests may indicate the amount of memory needed and any other memory preferences (e.g., location of the device, type of device, size of device, etc.). The OOM handler may ask (e.g., via a device driver) each located device for more memory. After receiving a request, each paravirtualized memory device may respond immediately, either stating that more memory has been made available using the paravirtualized memory device, or that the paravirtualized memory device is unable to provide additional memory. If the paravirtualized memory device is unable to provide memory, the OOM handler may locate and ask additional paravirtualized memory devices for additional memory.

A memory device may be a virtual memory device or a virtualized memory device. Additionally, a memory device may be a paravirtual device or a paravirtualized device (e.g., a paravirtualized memory device). Some paravirtualized devices decrease I/O latency and increase I/O throughput to near bare-metal (e.g., a bare-metal hypervisor or type 1 hypervisor that runs directly on the hardware and that hosts guest operating systems) levels, while other paravirtualized devices add functionality to virtual machines that is not otherwise available. Due to paravirtualized devices ability to decrease I/O latency and increase I/O throughput, paravirtualized devices (e.g., paravirtualized memory devices) may be better suited than emulated devices for virtual machines running I/O intensive applications. Paravirtualized memory devices may be high-performance virtual storage devices that provide storage to virtual machines. Additionally, paravirtualized memory devices may be associated with a virtual machine's RAM. In an example, a paravirtualized memory device may have the ability to resize the virtual machine address space. As discussed in the present specification, and unless otherwise indicated, a memory device may refer to a physical memory device, a virtualized memory device, and/or a paravirtualized memory device, as would be understood by those skilled in the art.

Once the device driver has been granted more memory from a paravirtualized memory device, the device driver may request to plug more memory chunks of device memory and make the newly granted physical memory usable by the guest operating system. At this point, the OOM handler has successfully located more free physical memory and can report the newly granted physical memory to the guest operating system, thereby avoiding the OOM killer all together.

Since the requesting and adding new physical memory to the virtual machine and adding the newly usable device memory to the operating system happens synchronously from the OOM handler, the OOM killer advantageously remains deactivated as long as a paravirtualized memory device can still provide additional memory. By reducing or eliminating the risk of the OOM killer killing processes which may result in data loss or cause the system to become unstable or crash, virtual machines may advantageously be started with a relatively small amount of memory. As the virtual machines need more memory, the additional memory may be requested and added to the virtual machine and therefore to the guest OS. The virtual machine memory size advantageously grows on demand without risking data loss or system instabilities. Additionally, the virtual machine memory size grows independent of prior guest operations and advantageously allows the guest OS to go beyond its initial memory (which may be initially set at a relatively small amount to conserve system resources) according to a maximum configured by a system administrator.

FIG. 1 depicts a high-level component diagram of an example computing system 100 in accordance with one or more aspects of the present disclosure. The computing system 100 may include an operating system (e.g., host OS 186), one or more virtual machines (VM 170A-B), and nodes (e.g., nodes 110A-C).

Virtual machines 170A-B may include a guest OS(s), guest memory or virtual machine memory, a virtual CPU (VCPU), virtual memory devices (VMD), and virtual input/output devices (VI/O). The virtual machines 170A-B may also include paravirtualized memory devices. Each guest OS may include instances of device drivers associated with the paravirtualized memory devices. Additionally, each guest OS may activate an OOM handler and/or an OOM killer. For example, virtual machine 170A may include guest OS 196A-B, guest memory or virtual machine memory 195A, a virtual CPU 190A, a virtual memory devices 193A, a virtual input/output device 194A, and paravirtualized memory devices 197A-B. Virtual machine memory 195A may include one or more memory pages. Guest OS 196A may include device driver 188A associated with paravirtualized memory device 197A and Guest OS 196B may include device driver 188B associated with paravirtualized memory device 197B. Guest OS 196A may activate OOM handler 185A or OOM killer 187A and Guest OS 196B may activate OOM handler 185B or OOM killer 187B. The OOM handler 185A may communicate with device drivers (e.g., device drivers 188A-B), which in return may communicate to the paravirtualized memory devices (e.g., paravirtualized memory devices 197A-B) and also the hypervisor 180.

Similarly, virtual machine 170B may include guest OS 196C, guest memory or virtual machine memory 195B, a virtual CPU 190B, a virtual memory devices 193B, and virtual input/output device 194B, and paravirtualized memory devices 197C-D. Virtual machine memory 195B may include one or more memory pages. Guest OS 196C may include device driver 188C associated with paravirtualized memory device 197C and device driver 188D associated with paravirtualized memory device 197D. Guest OS 196C may activate OOM handler 185C or OOM killer 187C.

As illustrated, each guest OS (e.g., guest OS 196A) may have dedicated instances of a device driver (e.g., device driver 188A-B) per paravirtualized memory device (e.g., paravirtualized memory device 197A). In other examples, a device driver may manage multiple paravirtualized memory devices.

The paravirtualized memory devices 197A-D may include persistent memory, which may be accessed using memory instructions or memory APIs after the end of a process.

The computing system 100 may also include a hypervisor 180 and host memory 184. Hypervisor 180 may manage host memory 184 for the host operating system 186 as well as memory allocated to the virtual machines 170A-B and guest operating systems 196A-C such as guest memory or virtual machine memory ("VM memory") 195A-B provided to guest OS 196A-C. Host memory 184 and virtual machine memory 195A-B may be divided into a plurality of memory pages that are managed by the hypervisor 180. Virtual machine memory 195A-B allocated to the guest OS 196A-C may be mapped from host memory 184 such that when a guest application 198A-D uses or accesses a memory page of virtual machine memory 195A-B, the guest application 198A-D is actually using or accessing host memory 184.

The hypervisor 180 may control, account for, and limit memory allocation processes handled by the OOM handler. When a virtual machine or guest OS indicates that more memory is needed, the guest OS (e.g., guest OS 196A, hereinafter generally referred to as guest OS 196) may activate the OOM handler (e.g., OOM handler 185A, hereinafter generally referred to as OOM handler 185). Once activated, the OOM handler 185 may be configured to ask paravirtualized memory devices (e.g., paravirtualized memory devices 197A-B, hereinafter generally referred to as paravirtualized memory devices 197) for more memory. For example, the OOM handler 185 may look for paravirtualized memory devices 197 that are potential candidates to fulfill an out-of-memory request. The OOM handler 185 may ask (e.g., via a device driver 188A-B, hereinafter generally referred to as device driver 188) each located paravirtualized memory device 197 for more memory.

After receiving a request, each paravirtualized memory device 197 may respond by stating that more memory has been made available using the paravirtualized memory device 197 or that the paravirtualized memory device 197 is unable to provide additional memory. If the paravirtualized memory device 197 is unable to provide memory, the OOM handler 185 may locate and ask additional paravirtualized memory devices 197 for additional memory.

Once the device driver 188 has been granted more memory from a paravirtualized memory device 197 (e.g., when a paravirtualized memory device 197 responds that more memory has been made available), the device driver 188 may request to plug more memory chunks of device memory and make the newly granted physical memory usable by the guest operating system 196. Then, the OOM handler 185 may report to the guest OS 196 that the newly granted physical memory has been made usable by the guest OS 196.

The OOM handler 185 may send out-of-memory requests to device drivers 188 associated with paravirtualized memory devices 197 to determine if more memory (e.g., "unavailable" memory) may be made "unusable". Once "unavailable" memory is made "unusable", the "unusable" memory may be turned into "usable" memory for the guest via a plug request.

As used herein, "unavailable" memory is memory that has not yet been made available for plugging. For example, first "unavailable" memory has to be made "unusable", which is available for plugging by the hypervisor (e.g., as a result of an OOM request from the guest OS 196) before it becomes "usable" memory, which can be used by the guest OS 196. For example, "unavailable" memory may become "unusable" memory, which may then be turned into "usable" memory by the guest OS 196 (e.g., via a plug request).

As used herein, "usable" memory is memory that is usable or made available to the guest OS (e.g., guest OS 196A-B). For example, initialization memory or memory used to initialize the virtual machine may be exposed to the guest OS 196 as "usable" memory that the guest uses to initialize. Additionally, device drivers 188 may add "usable" memory to the guest OS 196 from paravirtualized memory devices 197. Memory is "usable" as soon as the memory is plugged. For example, before the memory is reported to the guest OS 196, the memory is "usable" because the memory can be safely accessed. After the memory is plugged, the "usable" memory is reported to the guest OS 196. Reporting "unusable" or "unavailable" memory to the guest OS 196 may result in a system crash or failure.

Similarly, as used herein, "unusable" memory is memory that is currently not made available to the guest OS 196, but is available for plugging. For example, the memory of a paravirtualized memory device 197 is "unusable" memory to the guest OS 196 because the memory is not exposed to the guest OS 196 and thus the guest OS 196 is unable to use the memory. Once "unusable" memory is plugged, it becomes "usable" memory.

By plugging memory (e.g., turning memory "usable"), the guest OS 196 may explicitly indicate that the guest OS 196 "wants to use" a certain memory chunk. By handling memory in this way, the guest OS 196 is properly charged for memory that the guest OS 196 can actually use. For example, some "unusable" memory may not be addressable by the guest OS 196 or may not be capable of being added to the guest OS 196 (e.g., due to alignment issues). By keeping certain areas or memory chunks "unplugged", the guest OS 196 is prevented from using those areas. In an example, if a device driver (e.g., device driver 188A-D) does not start up, memory may remain "unusable" so the guest OS 196 is not charged for the memory because the guest OS 196 cannot and will not use it.

In an example, a virtual machine 170A may execute a guest operating system 196A and run applications 198A-B which may utilize the underlying VCPU 190A, VMD 193A, and VI/O device 194A. One or more applications 198A-B may be running on a virtual machine 170A under the respective guest operating systems 196A-B. A virtual machine (e.g., VM 170A-B, as illustrated in FIG. 1) may run on any type of dependent, independent, compatible, and/or incompatible applications on the underlying hardware and OS. In an example, applications (e.g., App 198A-B) run on a virtual machine 170A may be dependent on the underlying hardware and/or OS 186. In another example embodiment, applications 198A-B run on a virtual machine 170A may be independent of the underlying hardware and/or OS 186. For example, applications 198A-B run on a first virtual machine 170A may be dependent on the underlying hardware and/or OS 186 while applications (e.g., application 198C-D) run on a second virtual machine (e.g., VM 170B) are independent of the underlying hardware and/or OS 186. Additionally, applications 198A-B run on a virtual machine 170A may be compatible with the underlying hardware and/or OS 186. In an example embodiment, applications 198A-B run on a virtual machine 170A may be incompatible with the underlying hardware and/or OS 186. For example, applications 198A-B run on one virtual machine 170A may be compatible with the underlying hardware and/or OS 186 while applications 198C-D run on another virtual machine 170B are incompatible with the underlying hardware and/or OS 186. In an example embodiment, a device may be implemented as a virtual machine (e.g., virtual machine 170A-B).

The computer system 100 may include one or more nodes 110A-C. Each node 110A-C may in turn include one or more physical processors (e.g., CPU 120A-E) communicatively coupled to memory devices (e.g., MD 130A-D) and input/output devices (e.g., I/O 140A-C). Each node 110A-C may be a computer, such as a physical machine and may include a device, such as hardware device. In an example, a hardware device may include a network device (e.g., a network adapter or any other component that connects a computer to a computer network), a peripheral component interconnect (PCI) device, storage devices, disk drives, sound or video adaptors, photo/video cameras, printer devices, keyboards, displays, etc. Virtual machines 170A-B may be provisioned on the same host or node (e.g., node 110A) or different nodes. For example, VM 170A and VM 170B may both be provisioned on node 110A. Alternatively, VM 170A may be provided on node 110A while VM 170B is provisioned on node 110B. Nodes 110A-C may be non-uniform memory access ("NUMA") nodes.

In an example, device memory may be located on paravirtualized memory devices 197A-D. Each paravirtualized memory device 197A-D may be associated with a memory region (e.g., a start address and an end address in the memory region). Additionally, each paravirtualized memory device 197A-D may be associated with a respective NUMA node (e.g., nodes 110A-C) or may be aware of the host's non-uniform memory access topology. For example, paravirtualized memory device 197A may be associated with node 110A, paravirtualized memory device 197B may be associated with node 110B, and paravirtualized memory devices 197C-D may be associated with node 110C. The present systems and methods are fully NUMA aware and are expected to be faster than existing balloon implementations.

As used herein, physical processor or processor 120A-E refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory device 130A-D refers to a volatile or non-volatile memory device, such as RAM, ROM, EEPROM, or any other device capable of storing data. As discussed herein, I/O device 140A-C refers to a device capable of providing an interface between one or more processor pins and an external device capable of inputting and/or outputting binary data.

Processors 120A-E may be interconnected using a variety of techniques, ranging from a point-to-point processor interconnect, to a system area network, such as an Ethernet-based network. Local connections within each node, including the connections between a processor 120A-E and a memory device 130A-D may be provided by one or more local buses of suitable architecture, for example, peripheral component interconnect (PCI).

Figure 2:
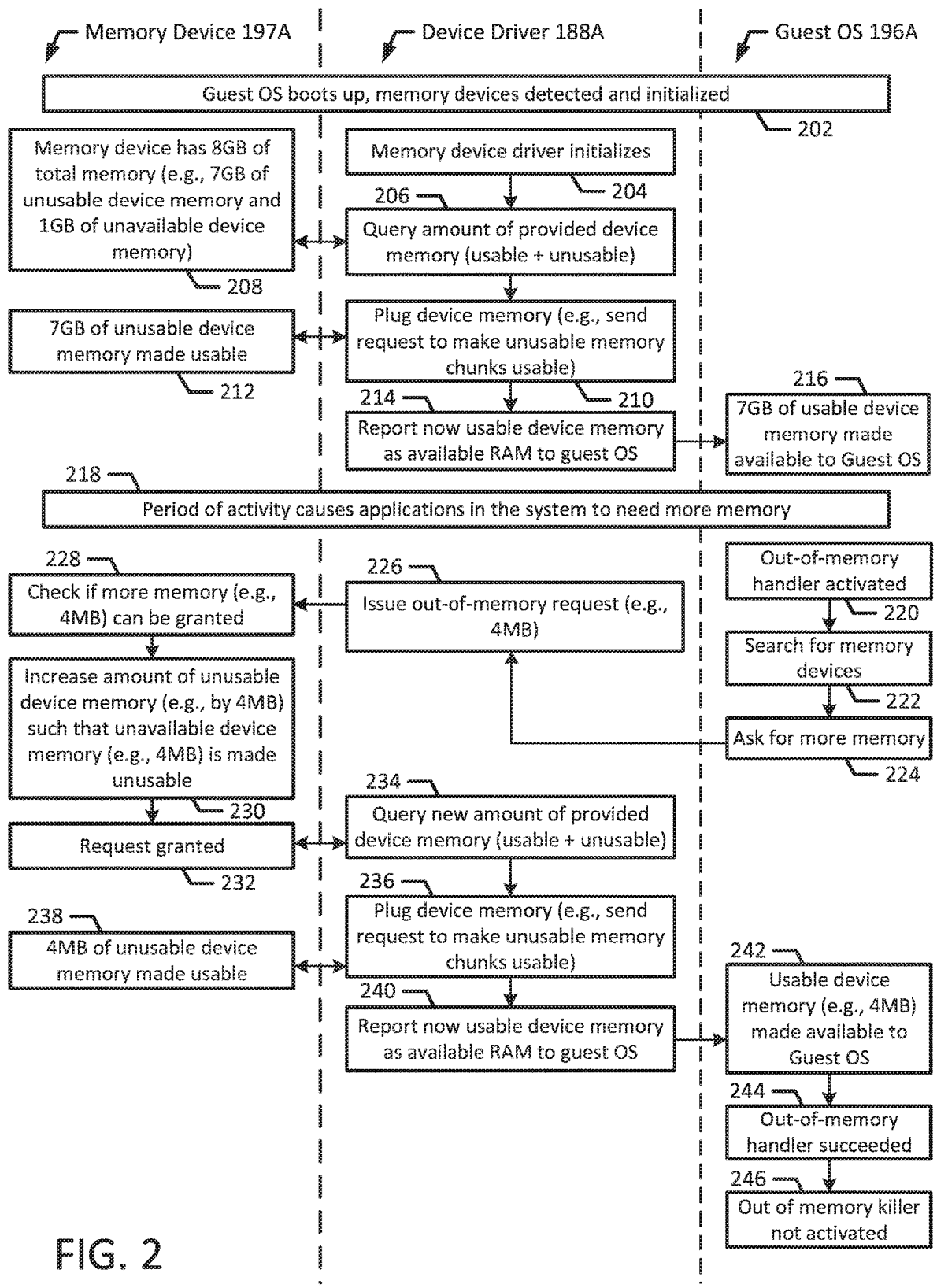
FIG. 2 illustrates a block diagram of dynamic virtual machine memory allocation according to an example embodiment of the present disclosure.

FIG. 2 illustrates a block diagram of dynamic virtual machine memory allocation. As illustrated in FIG. 2, guest OS 196A boots up and memory devices (e.g., paravirtualized memory device 197A) are detected and initialized (block 202). The memory device driver (e.g., device driver 188A) also initializes (block 202). After initialization, the device driver 188A may query an amount of device memory (e.g., usable and unusable memory) provided by the paravirtualized memory device (block 206). In the illustrated example, the paravirtualized memory device 197A may have 8 GB of total memory (e.g., 7 GB of unusable device memory and 1 GB of unavailable device memory) (block 208). The device driver 188A may plug device memory (e.g., send a request to make unusable memory chunks usable) (block 210). For example, by plugging the device memory, 7 GB of unusable device memory of paravirtualized memory device 197A may be made usable (block 212). Then, the device driver 188A may report the now usable device memory as available RAM to guest OS 196A (block 214). In the illustrated example, 7 GB of usable device memory is made available to the guest OS 196A (block 216).

As illustrated, a period of activity causes applications (e.g., applications 198A-B) to need more memory (block 218). The guest OS 196A may activate the OOM handler 185A (block 220), which may search for paravirtualized memory devices that can potentially provide additional memory to the guest OS (block 222). After locating a device (e.g., paravirtualized memory device 197A), the OOM handler 185A may ask for more memory (block 224). In the illustrated example, the OOM handler 185A may ask for more memory via the device driver 188A. Then, the device driver 188A may issue an out-of-memory request (e.g., to request an additional 4 MB of memory) to the paravirtualized memory device 197A (block 226). Then, the paravirtualized memory device 197A may check if more memory (e.g., 4 MB) can be granted. If additional memory is available, the paravirtualized memory device 197A may increase the amount of unusable device memory (e.g., by 4 MB) such that unavailable device memory (e.g., 4 MB) is made unusable (block 230). Then, the paravirtualized memory device 197A grants the request (block 232) and the device driver 188A queries the new amount of provided device memory (unusable and usable) (block 234). Then, the guest driver 188A plugs device memory (e.g., by sending a request to make unusable memory chunks usable) (block 236). After plugging the device memory, the 4 MB of unusable device memory is made usable (block 238) and the device driver 188A reports the now usable device memory as available ram to the guest OS 196A (block 240).

The guest OS 196A receives the report that usable device memory (e.g., 4 MB) is made available to the guest OS 196A (block 242). In the illustrated example, the OOM handler 185A succeeded in locating additional memory (block 244) and advantageously prevented the out-of-memory killer 185B from being activated (block 246).

As illustrated in FIG. 2, additional memory was advantageously added to guest OS 196A without a prior inflation operation and without having to kill other processes. By allowing OOM handler 185A to search for memory before activating the OOM killer 187A, the OOM killer 187A is activated only when additional memory is unavailable, which prevents the OOM killer 187A from prematurely killing processes, which may negatively affect system performance. Thus, the system of FIG. 2 advantageously enables a more efficient memory allocation, which improves memory density of hardware memory devices.

Figure 3:
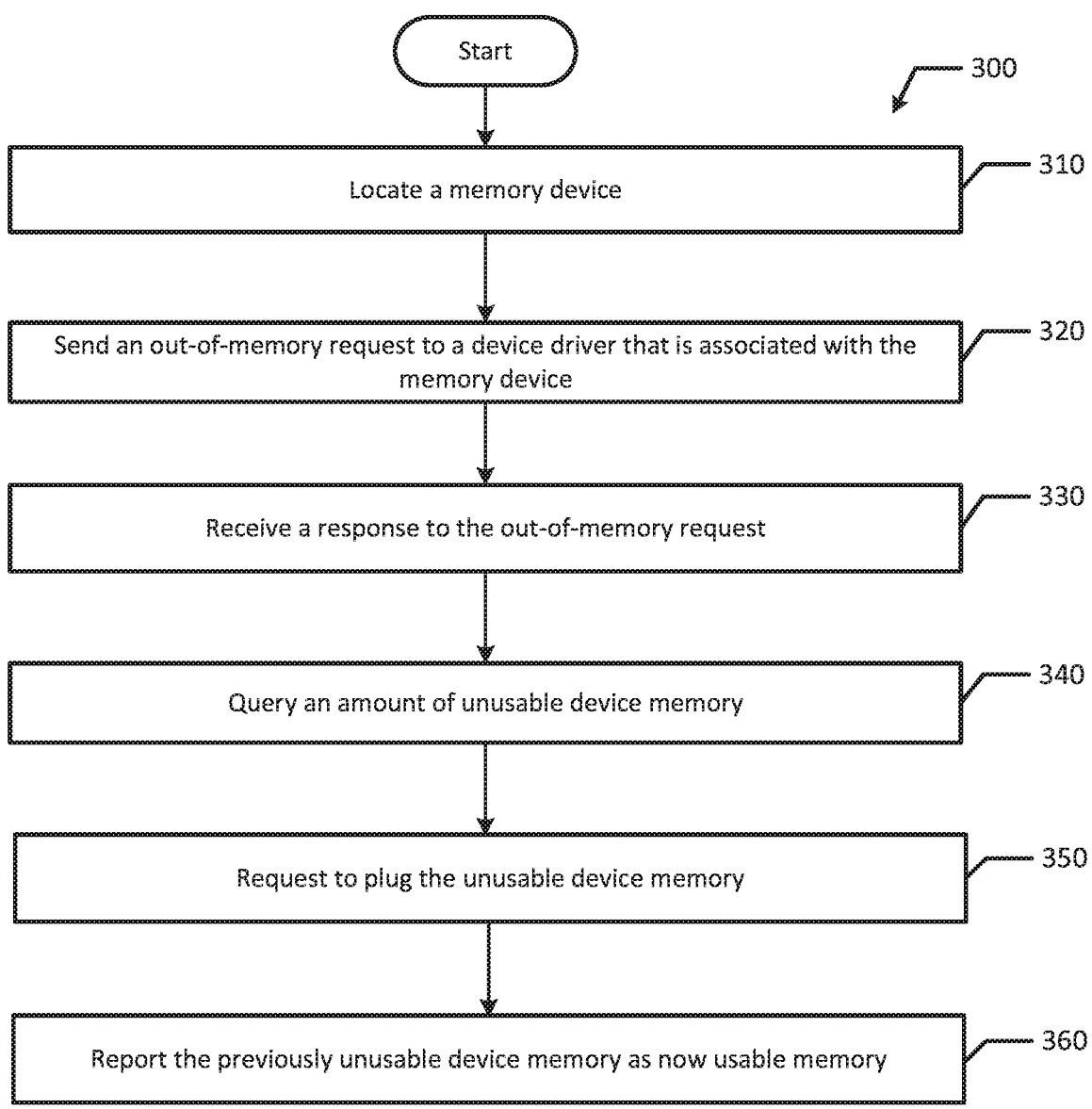
FIG. 3 illustrates a flowchart of an example process for dynamic virtual machine memory allocation according to an example embodiment of the present disclosure.

FIG. 3 illustrates a flowchart of an example method 300 for dynamic virtual machine memory allocation according to an example embodiment of the present disclosure. Although the example method 300 is described with reference to the flowchart illustrated in FIG. 3, it will be appreciated that many other methods of performing the acts associated with the method 300 may be used. For example, the order of some of the blocks may be changed, certain blocks may be combined with other blocks, one or more blocks may be repeated, and some of the blocks described are optional. The method 300 may be performed by processing logic that may comprise hardware (circuitry, dedicated logic, etc.), software, or a combination of both.

The example method 300 includes locating a memory device (block 310). For example, after activation, an OOM handler 185A may locate a memory device (e.g., paravirtualized memory device 197A). Paravirtualized memory devices may be located based on size, location, and/or preferences established in the out-of-memory request. Then, the method includes sending an out-of-memory request to a device driver that is associated with the memory device (block 320). For example, the OOM handler 185A may send an out-of-memory request to device driver 188A associated with paravirtualized memory device 197A. The paravirtualized memory device 197A may have been identified as a potential candidate to fulfill the out-of-memory request (e.g., due to the paravirtualized memory device's location, size, or based on some other ranking criteria). The method 300 also includes receiving a response to the out-of-memory request (block 330). For example, the OOM handler 185A may receive a response to the out-of-memory request from the paravirtualized memory device 197A. The response may indicate whether the paravirtualized memory device 197A is capable of satisfying the out-of-memory request (e.g., either partially or fully).

Additionally, the method includes querying an amount of unusable device memory (block 340). For example, after a paravirtualized memory device responds and grants a request, the device driver 188A may query an amount of unusable device memory of paravirtualized memory device 197A. Then, the method continues and includes requesting to plug the unusable device memory (block 350). For example, device driver 188A may request to plug the unusable device memory. Plugging memory may include sending a request to make unusable memory chunks usable. The method also includes reporting the previously unusable device memory as now usable memory (block 360). For example, the guest driver 188A may report the previously unusable device memory as now usable memory to the guest OS 196A. The usable memory may be reported as usable RAM to guest OS 196A.

Figure 4A:
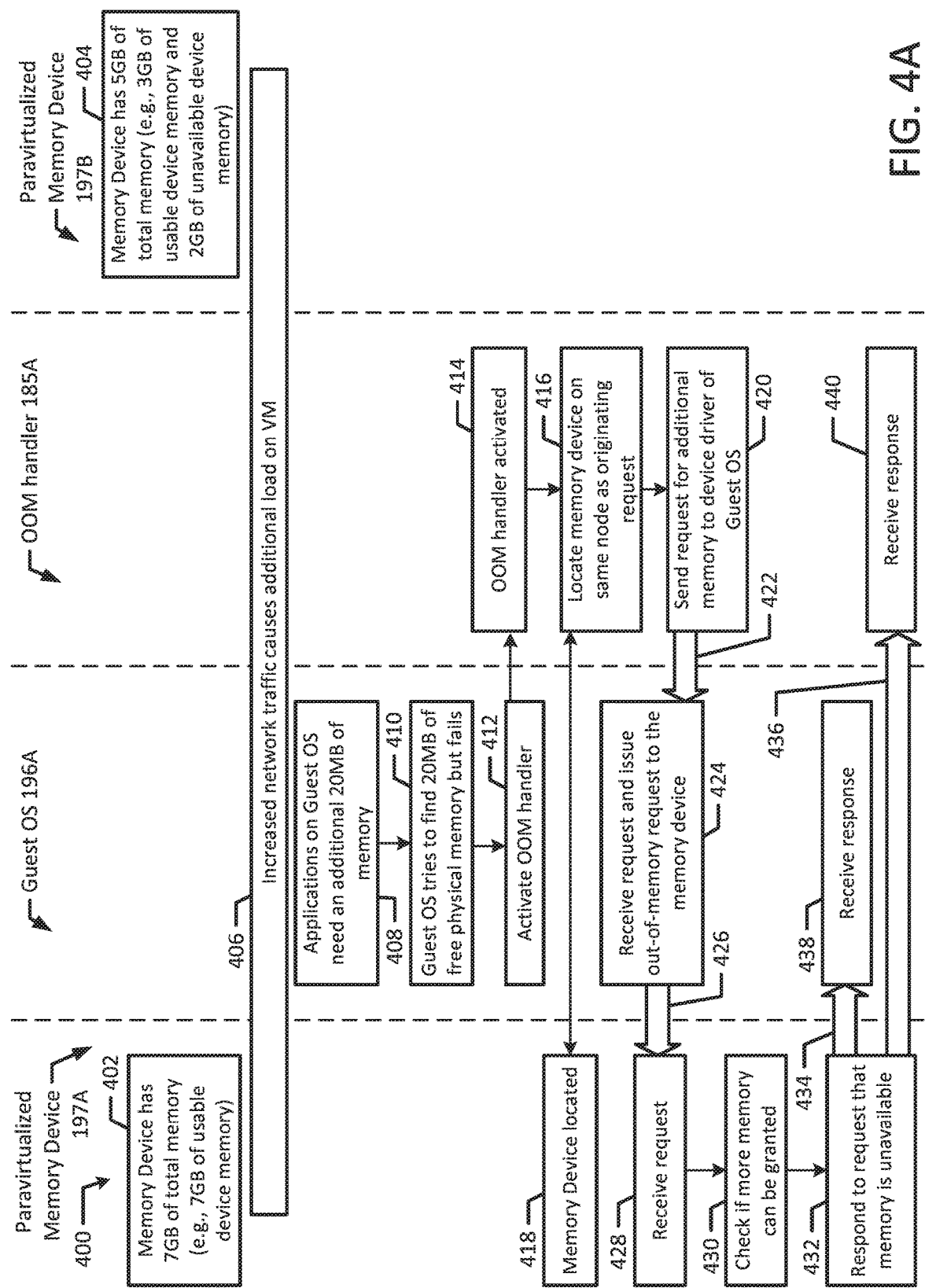
FIGS. 4A and 4B illustrate a flow diagram of an example process for dynamically allocating virtual machine memory according to an example embodiment of the present disclosure.
Figure 4B:
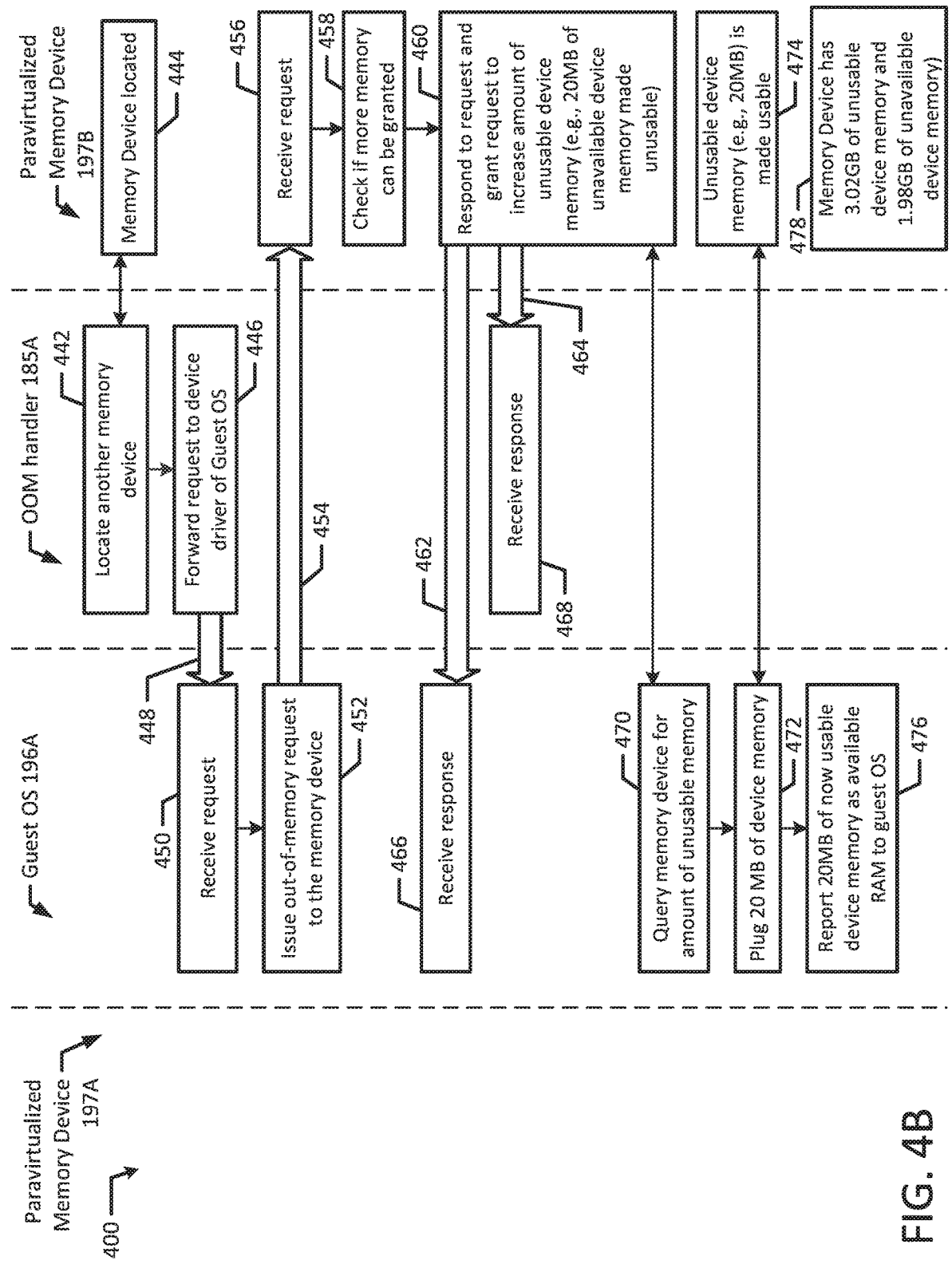

FIGS. 4A and 4B illustrate a flowchart of an example method 400 for dynamically allocating (e.g., increasing) virtual machine memory in accordance with an example embodiment of the present disclosure. Although the example method 400 is described with reference to the flowchart illustrated in FIGS. 4A and 4B it will be appreciated that many other methods of performing the acts associated with the method 400 may be used. For example, the order of some of the blocks may be changed, certain blocks may be combined with other blocks, one or more blocks may be repeated, and some of the blocks described are optional. For example, an OOM handler 185A and a guest OS 196A may communicate with paravirtualized memory devices 197A-B to perform example method 400.

In the illustrated example, paravirtualized memory device 197A has 7 GB of total memory (e.g., 7 GB of usable device memory) (block 402). For example, paravirtualized memory device 197A may be initialized with 7 GB of total memory. Additionally, paravirtualized memory device 197B has 5 GB of total memory (e.g., 3 GB of usable device memory and 2 GB of unavailable device memory (block 404). For example, paravirtualized memory device 197B may be initialized with 5 GB of total memory. Increased network traffic may cause additional load on a virtual machine (e.g., virtual machine 170A) (block 406). For example, applications (e.g., applications 198A-B) running on guest OS 196A may need an additional 20 MB of memory due to the increased network traffic (block 408). The increased network traffic may require applications to store, send and/or receive additional packets of data, which may require more RAM.

In the illustrated example, the guest OS 196A tries to find the 20 MB of free physical memory, but fails to do so (block 410). For example, 20 MB of physical memory may not readily be available to the guest OS 196A. Then, the guest OS 196A activates its OOM handler 185A (block 412). For example, the OOM handler 185A may be activated by the guest OS 196A to coordinate memory searches and to communicate with device drivers (e.g., device driver 188A). Then, the OOM handler is activated (block 414).

Once activated, the OOM handler 185A locates paravirtualized memory devices on the same node as the originating request (block 416). For example, the request (e.g., out-of-memory request) by the applications 198A-B and/or guest OS 196A may specify that the memory should be from a memory device (e.g., paravirtualized memory device) on the same node as the applications 198A-B and/or guest OS 196A that the request originated from. After looking for paravirtualized memory devices, the OOM handler 185A locates paravirtualized memory device 197A (block 418). Paravirtualized memory devices may be located and/or ranked based on criteria. For example, paravirtualized memory devices may be located based on device location, device size, and history information from previous out-of-memory requests. If during a previous search, a paravirtualized memory device indicated that additional memory was unavailable, then the paravirtualized memory device may be ranked lower and may be ask for additional memory after other devices are first asked. Similarly, if a paravirtualized memory device indicated that additional memory was available during a previous inquiry, that paravirtualized memory device may be asked again, prior to asking other paravirtualized memory devices.

In an example, the host OS may deny a guest OS request to increase its memory in case the operation cannot be satisfied without incurring problems in the host OS. Additionally, requests may be denied if the host OS suspects the requests are malicious. For example, an affected guest may continue to request additional memory for malicious applications.

Then, the OOM handler 185A sends a request for additional memory to the device driver 188A (associated with the located paravirtualized memory device 197A) of the guest OS 196A (blocks 420 and 422). For example, after locating a potential candidate, the OOM handler 185A may have the device driver 188A issue an out-of-memory request. The guest OS 196A receives the out-of-memory request to the paravirtualized memory device and forwards the request to the paravirtualized memory device 197A (blocks 424 and 426). For example, device driver 188A of guest OS 196A may receive the request and may communicate the request to paravirtualized memory device 197A. Then, paravirtualized memory device 197A receives the request (block 428). After receiving the request, the paravirtualized memory device 197A checks if more memory can be granted (block 430). For example, the paravirtualized memory device 197A may check to see if unavailable memory may be used to satisfy the request. In an example, the paravirtualized memory device 197A may satisfy the request in full or in part. Then, the paravirtualized memory device 197A responds to the request that memory is unavailable (blocks 432, 434 and 436). In the illustrated example, paravirtualized memory device 197A has insufficient memory to satisfy the request, either fully or partially.

As illustrated in FIG. 4A, both the guest OS 196A and OOM handler 185A receive the response (blocks 438 and 440). The paravirtualized memory device 197A may respond directly to the device driver 188A, which may then communicate the response to the OOM handler 185A and/or guest OS 196A.

Continuing on FIG. 4B, the OOM handler 185A locates another paravirtualized memory device (block 442). For example, since paravirtualized memory device 197A was unable to satisfy the request, the OOM handler 185A may continue to locate and request memory from additional paravirtualized memory devices. In an example, multiple paravirtualized memory devices may satisfy a request. For example, a portion of the request (e.g., 5 MB) may be satisfied by one device and another portion of the request (e.g., 15 MB) may be satisfied by another paravirtualized memory device. After looking for other paravirtualized memory devices, paravirtualized memory device 197B is located by the OOM handler 185A (block 444). In an example, paravirtualized memory device 197B may have been located previously by the OOM handler 185A during its initial search at block 416. Memory devices may be located simultaneously and ranked. For example, paravirtualized memory device 197B may have been located along with paravirtualized memory device 197A, but ranked as a less promising candidate than paravirtualized memory device 197A and thus asked to satisfy the request after paravirtualized memory device 197A was asked. Then, the OOM handler 185A forwards the request to the applicable device driver (e.g., device driver 188B) of guest OS 196A (blocks 446 and 448). In the illustrated example, each guest OS may include instances of device drivers associated with the paravirtualized memory devices.

Then, the guest OS 196A receives the request (block 450). After receiving the request, the guest OS 196A may issue an out-of-memory request to the newly located paravirtualized memory device 197B (blocks 452 and 454). In an example, the guest OS 196A may issue the out-of-memory request via device driver 188B, which is associated with paravirtualized memory device 197B. Then, the paravirtualized memory device 197B receives the request (block 456). After receiving the request, the paravirtualized memory device 197B checks if more memory can be granted per the out-of-memory request (block 458).

The paravirtualized memory device 197B responds to the request and grants request to increase the amount of unusable device memory (e.g., 20 MB of unavailable device memory made unusable) (blocks 460, 462 and 464). For example, the paravirtualized memory device 197B may respond that memory is available and may grant the request. Then, the guest OS 196A and OOM handler 185A receive the response (blocks 466 and 468). The paravirtualized memory device 197B may respond directly to the device driver 188B, which may then communicate the response to the OOM handler 185A and/or guest OS 196A.

After receiving the response, the guest OS 196A may query the paravirtualized memory device 197B for amount of unusable memory (block 470). For example, guest OS 196A may query the paravirtualized memory device 197B via device driver 188B. Then, the guest OS 196A may plug 20 MB of device memory (block 472). For example, the guest OS 196A may plug device memory via device driver 188B. The device driver 188B may request to plug more memory chunks of device memory and make the newly granted physical memory usable by the guest OS 196A. After plugging 20 MB of the device memory, the unusable device memory (e.g., 20 MB) is made usable (block 474).

Then, the device driver 188B of guest OS 196A may report the 20 MB of now usable device memory as available RAM to guest OS 196A (block 476). As illustrated in FIG. 4B, the paravirtualized memory device 197B has 3.02 GB of usable device memory and 1.98 GB of unavailable device memory (block 478).

Figure 5:
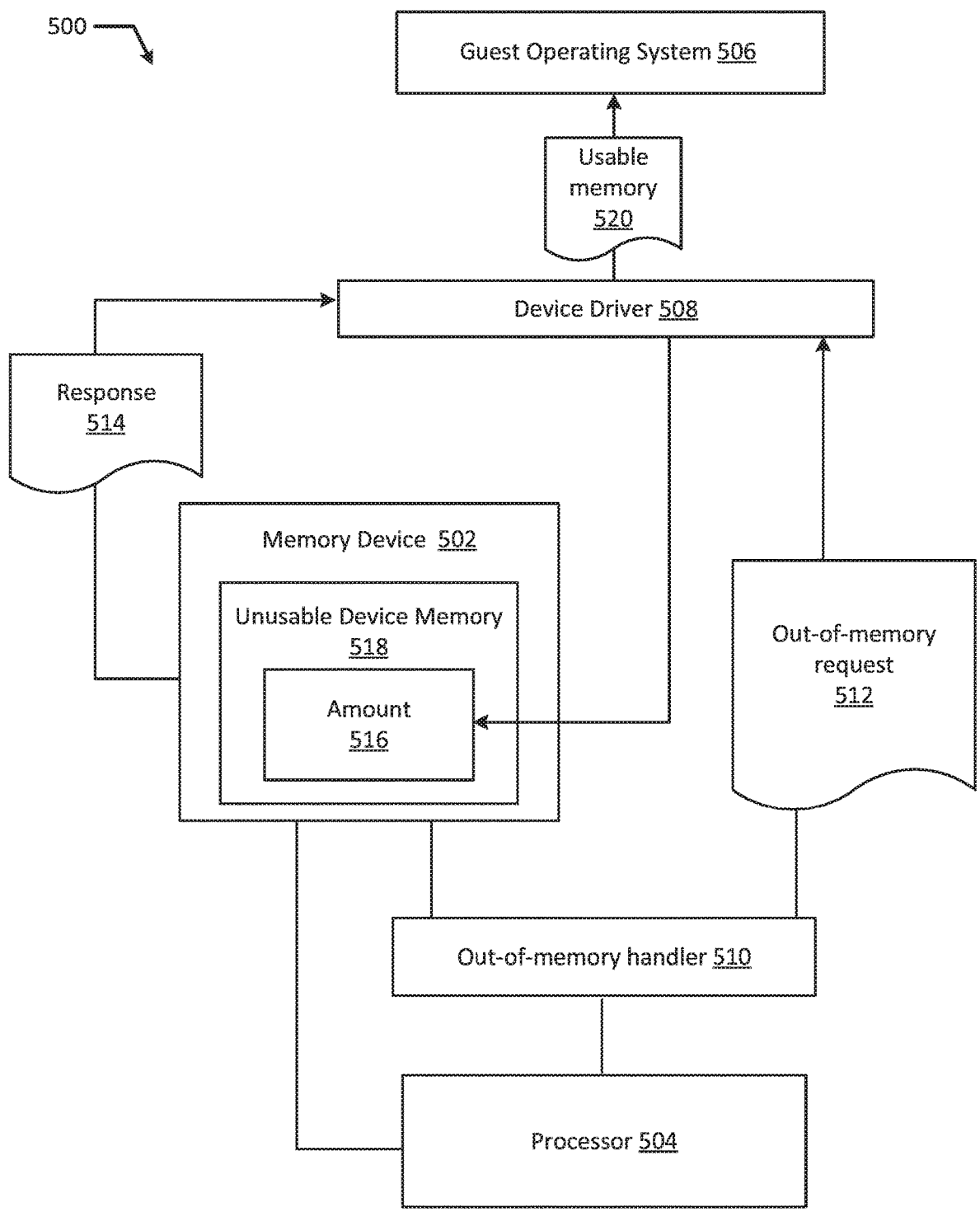
FIG. 5 illustrates a block diagram of an example virtual machine memory allocation system according to an example embodiment of the present disclosure.

FIG. 5 is a block diagram of an example virtual machine memory allocation system 500 according to an example embodiment of the present disclosure. The virtual machine memory allocation 500 includes at least one memory device 502 (e.g., paravirtualized memory device), at least one processor 504 in communication with the at least one memory device 502 (e.g., paravirtualized memory device), a guest operating system 506 associated with a device driver 508, and an out-of-memory handler 510 executing on the at least one processor 504. The OOM handler 510 may be configured to locate a memory device 502 (e.g., paravirtualized memory device) of the at least one memory device 502, send an out-of-memory request 512 to the device driver 508 that is associated with the memory device 502 (e.g., paravirtualized memory device), and receive a response 514 from the memory device 502 (e.g., paravirtualized memory device). The device driver 508 may be configured to query an amount 516 of unusable device memory 518, request to plug the unusable device memory 518, and report the previously unusable device memory 518 as now usable memory 520.

Instead of the guest OS 506 activating an out-of-memory killer to free up additional memory, the out-of-memory handler 510 ensures that requesting and adding new physical memory to the virtual machine and adding the newly usable device memory to the operating system happens synchronously without the need of prior guest OS involvement (e.g., inflating a balloon) and without risking data loss or instabilities caused by the OOM killer.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A system comprising:
   at least one memory device;
   at least one processor in communication with the at least one memory device;
   a guest operating system (OS) associated with a device driver; and
   an out-of-memory (OOM) handler executing on the at least one processor, wherein the OOM handler is configured to:
      locate a memory device of the at least one memory device,
      send an out-of-memory request to the device driver that is associated with the memory device, and
      receive a response from the memory device,
   wherein the device driver is configured to:
      query an amount of unusable device memory of the memory device, wherein the unusable device memory is available for plugging,
      request to plug the unusable device memory of the memory device, wherein the request to plug is a request to change the unusable device memory to usable memory, and
      report the previously unusable device memory as now usable memory.

2. The system of claim 1, wherein the OOM hander is configured to locate a different memory device of the at least one memory device responsive to receiving the response, wherein the response indicates that memory has not been made available for plugging.

3. The system of claim 1, wherein the memory device is a paravirtualized memory device.

4. The system of claim 1, wherein the memory device is aware of a host non-uniform memory access topology.

5. The system of claim 1, wherein the memory device is associated with a non-uniform memory access node.

6. The system of claim 1, wherein the OOM handler is configured to locate the memory device based on at least one of, memory device location, memory device size, and history information from previous out-of-memory requests.

7. The system of claim 1, wherein the out-of-memory request indicates an amount of requested memory.

8. The system of claim 7, wherein a first portion of the amount of requested memory is satisfied by a first memory device, and a second portion of the amount of requested memory is satisfied by a second memory device.

9. The system of claim 7, wherein the entire amount of requested memory is satisfied by the memory device.

10. A method comprising:
    locating, by an out-of-memory (OOM) handler, a memory device;
    sending, by the OOM handler, an out-of-memory request to a device driver that is associated with the memory device;
    receiving, by the OOM handler, a response to the out-of-memory request from the memory device;
    querying, by the device driver, an amount of unusable device memory of the memory device, wherein the unusable device memory is memory available for plugging;
    requesting, by the device driver, to plug the unusable device memory, wherein requesting to plug is requesting to change the unusable device memory to usable memory; and
    reporting, by the device driver, the previously unusable device memory as now usable memory.

11. The method of claim 10, wherein the response to the out-of-memory request indicates a status of one of (i) sufficient unusable memory to satisfy the request and (ii) insufficient unusable memory to satisfy the request.

12. The method of claim 11, further comprising:
    responsive to receiving a response indicating a status of insufficient unusable memory, locating, by the OOM handler, a different memory device; and
    sending, by the OOM handler, a different out-of-memory request to a different device driver that is associated with the different memory device.

13. The method of claim 12, wherein the memory device and the different memory device are on a single non-uniform memory access node.

14. The method of claim 12, wherein the memory device and the different memory device are on different non-uniform memory access nodes.

15. The method of claim 10, further comprising:
    reviewing, by the memory device, the out-of-memory request; and
    denying, by the memory device, the out-of-memory request.

16. The method of claim 10, wherein the out-of-memory request indicates an amount of requested memory.

17. The method of claim 16, wherein a first portion of the amount of requested memory is satisfied by a first memory device, and a second portion of the amount of requested memory is satisfied by a second memory device.

18. The method of claim 16, wherein the entire amount of requested memory is satisfied by the memory device.

19. A non-transitory machine readable medium storing code, which when executed by a processor, is configured to:
    locate a memory device;
    send an out-of-memory request to a device driver that is associated with the memory device;
    receive a response to the out-of-memory request from the memory device;
    query an amount of unusable device memory of the memory device, wherein the unusable device memory is available for plugging;
    request to plug the unusable device memory, wherein the request to plug is a request to change the unusable device memory to usable memory; and
    report the previously unusable device memory as now usable memory.

20. The non-transitory machine readable of claim 19, further configured to:
    locate a different memory device; and
    send a different out-of-memory request to a different device driver that is associated with the different memory device.

* * * * *